United States Patent Office 3,849,528
Patented Nov. 19, 1974

3,849,528
MICROPOROUS POLYMER SHEETS
Albert Ernest Smith, Ottawa, Ontario, Canada, assignor to Polysar Limited-Polysar Limited, Sarnia, Ontario, Canada
No Drawing. Filed Jan. 8, 1973, Ser. No. 321,931
Claims priority, application Canada, Feb. 16, 1972, 134,862
Int. Cl. B29h 7/20
U.S. Cl. 264—49                                10 Claims

ABSTRACT OF THE DISCLOSURE

Novel microporous polymer sheets are produced by:

(a) Cooling a solution of a flowable polymer below the freezing point whereby the solvent separates from the solution in the form of crystals dispersed in a continuous matrix of said polymer, (b) Curing said polymer while maintaining said solvent crystals, and (c) Removing said solvent crystals either by sublimation, evaporation or by washing.

The sheets have an average pore size of up to 20 microns, preferably less than 10 microns, and the maximum pore size is about 5–10 times the average size; pores are oriented in the direction perpendicular to the surface of the sheet.

The microporous sheets are suitable for use as filters, decorative sheeting, leather substitutes and protective breathable fabrics.

---

This invention relates to microporous sheets of synthetic polymers and to articles made therewith. In particular, it relates to the process of producing microporous sheets from a solution of low molecular weight polymers.

A variety of processes is known in the art for the production of microporous sheets, films or membranes. German patent application 2,011,842 describes a process in which an emulsion having a continuous phase of liquid polyurethane prepolymer and a disperse phase of fine droplets of an inert liquid is cured at a temperature below the boiling point of the liquid; after curing, the liquid is evaporated to produce microporous sheets having cellular structure. Microporous sheets are also produced by curing a fine dispersion of solid particles, e.g. borax in the continuous phase of a plastic polymer followed by dissolving said particles with a suitable solvent, e.g. water. Such process is described in U.S. Pat. 3,375,209.

Canadian Pat. 870,048 describes a process in which a solution of a thermoplastic polymer is shaped and then freeze dried to produce porous structures. The process is limited to solid polymers having relatively high softening point.

It is the object of this invention to provide a process for the production of microporous sheets from a solution of flowable polymers. Another object is to provide a process in which a solution of flowable polymer is frozen and the polymer is cured while the solution is in the frozen state. A further object is to provide microporous structure having uniform oriented porosity.

In accordance with this invention, a process is provided for producing a microporous sheet which comprises:

(1) Depositing on a support a layer of a liquid solution of a composition comprising a flowable polymer and a curative for said polymer in a solvent capable of forming crystals on cooling to and below the freezing point;

(2) Cooling said layer at a temperature below the freezing point of said solution whereby said solvent separates from the solution in the form of crystals dispersed in the matrix of said composition;

(3) Reacting said composition while maintaining said solvent crystals until said matrix becomes non-flowable and substantially insoluble in said solvent at a temperature above the freezing point; and (4) Removing said solvent crystals without substantially distorting said matrix.

The term "microporous sheet" used in this specification designates sheets, films and membranes of film-forming polymeric material having at least one side provided with micropores of up to 20 microns, preferably less than 10 micron in diameter. The other side of the sheet may be microporous or macroporous or may be formed of matted fibres with interstices defined by said fibers. The sheet of this invention is gas and vapor permeable and also permeable to a variety of liquid substances such as water, alcohols, ketones and hydrocarbons. It may be used as a leather substitute, a fabric for the manufacture of protective apparel, or a membrane for filtration of fluids. The thickness of the sheet may vary as required depending on the conditions of its end use.

The process of this invention is carried out on flowable synthetic polymer or prepolymer compositions which are curable at temperatures of about 100° C., preferably below 60° C., to form insoluble polymeric material. The polymeric or prepolymeric composition preferably is a mixture of liquid polymer or precursor of such polymer (also known as prepolymer) with curative. However, solid or nearly solid polymers can also be used in accordance with this invention. These polymers or prepolymers are chemical substances containing two or more reactive groups such as hydroxyl, preferably allyl hydroxyl groups, thiols, amine groups, isocyanate groups, carboxylic and thiocarboxylic groups, halide and preferably allyl halide groups. These reactive groups must be capable of reacting with curatives at temperatures below the melting point of the solvent used in the process and described further down, preferably not more than about 100° C. and most preferably below about 60° C. The reactive groups of the prepolymers or polymers are attached to and preferably separated from each other by a radical which may be a low molecular ether, ester, hydrocarbon, imine, amide, silicone or sulfide radical or a polymeric radical having a plurality of the same or different low molecular radicals joined together. The molecular weight of polymers and prepolymers may range from about 100 to about 100,000, although liquid materials having a molecular weight of about 200 to about 10,000 are preferably used. Representatives of such preferred polymers are polyether or polyester prepolymers having two or more isocyanate groups, polymers of conjugated diene having terminal allyl bromide groups or brominated butyl rubber.

The curatives that can be used in this invention are polyfunctional compounds capable of reacting with two or more reactive groups of the prepolymer or polymer. They preferably have a low molecular weight of not more than about 1,000, and are selected from polyisocyanates such as tolylene diisocyanate, diphenylmethane diisocyanate, hexamethylene diisocyanate; polyols such as butane diol, diethylene glycol, pyrocatechol, 1,1,1-trimethylol propane, glycerol, or mixtures thereof; polyamines such as tolylene diamine, benzidine, dianisidine, triethylene tetramine, pentaethylene hexamine; polysulfides; halides of sulfur and halides of polycarboxylic acids. Polyisocyanates are used with polymers having reactive groups such as hydroxyls, thiols, carboxylic groups or amines; polyols and polyamines are used with polymers and prepolymers having multiple isocyanate groups; polyamines are also used with polymers having reactive halogen groups such as allylic bromide groups. The rate of reaction between the polymer or prepolymer and the curative may be controlled by the selection of suitable curatives and suitable conditions. If it is desirable to increase the rate, catalysts may be added. For example, polyurethane reaction (between isocyanate groups and groups having labile hydrogen, e.g. OH, SH, $NH_2$) may be speeded by the addition of sodium acetate, ferric acetylacetonate, cobalt naphthenate, triethylamine, N-methyl morpholine, dimethyl tin dichloride or similar compounds.

The polymeric composition containing flowable polymer or prepolymer and a curative and optionally a catalyst as described above is dispersed in an inert organic solvent. The solvent must be capable of crystallizing on cooling below the freezing point which may range within wide limits from about −50° C. to 250° C. but preferably is between about 50° C. and 150° C. This preferred relatively high freezing point is desirable so that the curing reaction proceeds at a reasonable rate while the solvent remains in the form of fine crystals. Representative examples of such solvents are 1,4-dichlorobenzene, 1,4-dibromobenzene naphthalene, dichloronaphthalene, 1,2,4,5-tetramethyl benzene, pentachlorobenzene, 9,10-dihydroanthracene, N,N-diphenylacetamide, diphenylacetic acid, 1,4-cyclohexanedione and camphene. It is further preferable to use solvents that readily sublime wtihout melting at atmospheric pressures and at temperatures of about 20° C. to about 150° C.

The concentration of the polymeric composition in the solution may vary depending on the degree of porosity required in the final product, from as little as about 5% to 85% by weight.

In addition to the curable polymer, curative and catalyst, the solution may contain other polymers. They may be low or high molecular solid thermoplastic materials such as polyvinyl chloride, polystyrene, polymethylmethacrylate, acrylonitrile-butadiene-styrene copolymers (ABS resins) or elastomeric materials such as butadiene-styrene copolymers, nitrile rubber, butyl rubber, polychloroprene and polybutadiene. They are added, if it is desired, to modify either the process variables such as the initial solution viscosity or the tensile strength and brittleness of the frozen sheet or the properties of the resulting microporous sheet such as hardness, tear strength, flexural modulus, permeability, resistance to solvents, oils, oxygen, heat and light.

If desired, the solution may be admixed with fillers or reinforcing agents such as silica, clays, carbon blacks or fibrous materials such as asbestos, natural and synthetic organic fibres, with pigments and colorants and plasticizers. The above additives should not inhibit and, if possible, not interfere with the crystallization of the solvent in the present process. In some solutions, fillers may act as nucleating agents for the formation of solvent crystals and enhance uniform microporosity of the final sheet.

The solution is maintained in a liquid phase until it is spread on a support. It is preferred to mature the solution by maintaining it at an elevated temperature for a period about 1 to about 30 minutes short of gelation so as to reduce the time required for the subsequent curing. In that period of maturation, the reaction between flowable polymer and curative is initiated and proceeds to a point short of the rapid rise in solution viscosity. The support on which the solution of the polymeric material is deposited may be a release paper, casting belt or a mold from which the layer may or may not be stripped after freezing. It may also be a fabric, woven or non-woven, or a contoured (three-dimensional) structure to which the deposited layer of polymeric material is bonded. Conventional methods such as spraying, brushing, spreading, dipping or otherwise coating may be used to deposit a layer of uniform thickness on flat or three-dimensional supports or molds. The layer is then cooled to a temperature below and preferably at least about 40° C. below the freezing temperature of the solution so that the solvent solidifies in the form of small crystals and the polymeric composition forming a continuous phase, a matrix for said crystals, is thereby immobilized. The frozen layer so formed is a solid sheet which may be handled from that point on without support. It may be convenient to use cold metal molds so that the solution on contact therewith immediately freezes thereon forming a thin coating on the mold surface.

If it is desired to produce thicker sheets, multiple dippings, brushings or other coating steps may be required. However, it is possible to make sheets of up to about 2.5 cm. thick in enclosed molds which are provided with cooling means on both sides of the sheet. It is important that the solution be cooled rapidly right through the entire cross section so as to create as many crystals nuclei as possible and thus to restrict the growth of individual crystals to small sizes. In practice, it means that either the thickness is to be limited to about 0.6 cm. and less or that the deposit of the polymeric material is to be built up layer by layer, each layer being individually shock cooled so that the microporosity is not limited to the surface closest to the cooling surface. The frozen layer shows on its surface a macrocrystalline pattern. A number of crystalline centers are visible from which crystals radiate in straight lines over an area which is limited by the neighboring areas having different crystal orientation. The crystalline pattern may be retained in the process so that the microporous sheet can be obtained having a pleasing surface appearance. The larger the number of such crystalline centers and the smaller their area, the better is the microporosity and uniformity of the resulting sheet. The optimum microporosity is reached when the crystalline areas are small and barely visible. This happens when the solution is shock cooled at a temperature at least 40° C. below the freezing point, e.g. at 10° C. or lower for 1,4-dichlorobenzene.

In the next step, the polymer composition is cured while the solvent is in the form of the small crystals. The polymer and the curative should preferably be in the same phase although it is also possible to cure the polymer by exposing it to the action of external curative which may be applied, for example, in the form of vapor and diffused into the continuous polymer phase. The amount and the type of curative is matched to the polymer or prepolymer so as to achieve a reasonable rate of curing at a temperature below the freezing point of solvent crystals. The curing need not be complete or optimum for the desired physical properties. It is sufficient to cure the polymeric composition so that it just sets and becomes substantially insoluble in the solvent when the temperature is increased above the freezing temperature. The time required for curing may be predetermined for each polymeric composition at the desired conditions; it may vary from a few minutes to several days. For practical reasons, it is desired to limit the time of curing to less than 24 hours, preferably to not more than about five hours. The best temperature of curing is just below the freezing point and as the polymer becomes more and more insoluble the temperature may be gradually increased. In the case of polyurethane compositions dissolved in 1,4-dichlorobenzene, the maximum initial temperature of curing is about 50° C. and the time may vary between about ½ hour and 4 hours. Similar curing times are required for liquid polymers of butadiene having two terminal allylic bromide groups. The curing reaction should be carried out in an atmosphere saturated with the solvent vapor so as to avoid premature sublimation of crystals and to prevent the incompletely cured polymeric composition from flowing into and filling the cavities left after the sublimation of crystals nearest to the surface.

Next, the cured polymeric composition is subjected to conditions at which the dispersed solvent crystals are removed without substantially distorting the porous structure imposed on the polymer matrix by said crystals. There are several methods that can be used for the removal of the solvent.

The composition may be brought up to a temperature above the melting point of solvent and the solvent now in droplet form may be mechanically removed or washed out with a volatile liquid which is miscible with the solvent and a non-solvent for the polymer. It is preferable, however, to remove the solvent crystals without melting them so as to prevent the liquid solvent from diffusing back into the polymer phase. It is best done by subliming the solvent crystals at atmospheric pressure or in vacuum. The sublimation time depends on the vapor pressure of the solvent, the temperature, vacuum and the geometry of the sheet. It is obvious that in the case of very thin sheets of high porosity the solvent may be removed in a fraction of one hour. Less volatile solvents and thicker sheets may require up to 24 hours to remove most of the solvent. It is preferable that at least about 80% of the solvent be so removed before the temperature is allowed to go up to and above the melting point. However, if the exact retention of the shape as imposed during freezing is of no concern, the sublimation may be stopped after about 50% of the solvent is removed. The residual solvent may be reduced by the subsequent evaporation at elevated temperatures of up to the decomposition temperature of the cured polymeric composition, preferably at a temperature between about 60° C. and 200° C., or by washing with a suitable medium. The step of heating after the sublimation may be advisable if it is desired to complete the curing reaction (post-cure) and to improve the physical properties of the microporous sheets. With most polymer systems, satisfactory results are achieved by a post-cure at a temperature between about 60° C. and 200° C., preferably at 100–150° C.

The microporous sheet produced in accordance with this invention has an average pore size that may range from a fraction of one micron to about 20 microns but usually is less than 10 microns. The pores are oriented in the direction perpendicular to the surface of the sheet and are uniform; the maximum size is about 5–10 times the average size. The density may be varied from about 0.1 gram/milliliter to about 0.8 gram/milliliter, assuming that the density of the most polymeric materials is not very far from 1 gram/milliliter. The microporous sheets of this invention are characterized by good physical properties, i.e. tensile strength, tear strength, resistance to flexing and satisfactory scuff resistance. In addition, they show a permeability to gas and water vapor that many times surpasses the permeability of the commercial microporous synthetic materials.

The sheets are suitable for a wide variety of filter applacations, e.g. for purification of aqueous or alcoholic slurries, as dust filters, e.g. for gas masks and ventilation systems. The sheets have a pleasing appearance and a delicate warm texture; their matte surface can be embossed and/or printed during or after the process of the invention to produce decorative as well as sound and heat insulation sheeting for lining walls and ceilings and for automotive interiors. The polyurethane sheets made according to this invention resist wear and tear and can be used as a leather substitute in the footwear industry, as protective breathable fabric for use in industrial or professional apparel, fashion wear, bandages, covers for upholstered furniture.

The invention is further described and illustrated in the following examples.

EXAMPLE 1

A series of four microporous polyurethane sheets was produced using the following procedure:

50 parts by weight of polypropylene glycol having a molecular weight of about 2,000 was mixed with 15 parts by weight of tolylene diisocyanate and the mixture was allowed to react for 2 hours at 70° C. in the presence of 0.02 parts by weight of stannous octanoate. The product of the reaction, a liquid prepolymer having an isocyanate content of 13% and a viscosity of 800 centipoise at 25° C., was dissolved in 1,4-dichlorobenzene (DCB) at 70° C. to produce 20% solutions. The solution was then mixed with 2 parts of 1,4-butane diol and 6 parts of 1,1,1-trimethylol propane per 100 parts by weight of the prepolymer and the mixture was maintained at 70° C. for about 7 minutes. As the viscosity started to increase, the mixed solution was poured into a Teflon*-lined mold having 5 cm. x 5 cm. x 0.2 cm. dimensions and the mold was closed. The temperature was then reduced to about 25° C. whereby the solution froze in the mold to form solid sheet. Next, the frozen sheet showing a crystalline pattern in the surface was removed from the mold and cured in an atmosphere saturated with dichlorobenzene vapors at a temperature of about 25° C. for 24 hours. The cured sheet was then subjected to sublimation at an absolute pressure of 25 torr and a temperature of about 25° C. for 24 hours. Two of the sheets so produced were tested for permeability and the other two were heated at different time and temperature conditions to post-cure them and also to remove the residual dichlorobenzene. Details of the heating conditions and test results are presented in Table I.

TABLE I

| Test number | Post-cure temperature (° C.) | Heating time (min.) | Nitrogen [a] permeability (cm.$^4$/gm. sec.×10$^{-3}$) | Water vapor [b] transmission (g./m.$^2$ hr.) | Tensile strength (kg./cm.$^2$) |
|---|---|---|---|---|---|
| DL 1634-27-2 [c] | Nil | Nil | 3.0 | 37.4 | |
| -65-A | Nil | Nil | 4.2 | | 10.6 |
| -69-1 | 70 | 115 | 5.2 | | |
| -69-3 | 120 | 20 | [d] 19.5 | | |

[a] The volume of nitrogen which passes through a sample 1 cm.$^2$ in area, 1 cm. thick with a pressure of 1 gm./cm.$^2$.
[b] The weight of water vapor that passes through an area of 1 m.$^2$ per hour while maintaining 0 percent humidity on one side and about 50 percent on the other side of the sample.
[c] 25 percent prepolymer solution was used.
[d] Residual DCB reduced to 0.0604 percent.

The microporous sheets obtained in this Example were soft flexible sheets of pleasing warm hand and good appearance. They showed excellent nitrogen and water vapor permeability and satisfactory tensile strength. On post-curing, the nitrogen permeability increased about four times and at the same time the residual DCB was reduced to below 0.1% level.

EXAMPLE 2

Two microporous sheets were prepared by coating on a strip of a cotton knit fabric the solution of the prepolymer, 1,4-butane diol and 1,1,1-trimethylol propane of Example 1. The solution was maintained at 70° C. for about 7 minutes and then applied to the fabric by brush. Three or more applications of the solution were required to uniformly cover the fabric to the desired thickness of about 0.3 cm. The fabric was held at room temperature so that the solution solidified to form a coating with a fine crystalline pattern on the surface. The coated fabric was cured in the DCB saturated atmosphere for 24 hours at room temperature and then subjected to reduced pressure of about 100 Torr at a temperature of 25–40° C. for about 3 days. The resulting microporous coated sheets having a matte soft surface of pleasing warm hand were tested for density, nitrogen permeability and water vapor transmission. The results are presented in Table II.

TABLE II

| Test number | Concentration of the solution (percent polymer by weight) | Apparent density (g./cm.$^3$) | Nitrogen permeability (cm.$^4$/gm. sec.×10$^{-3}$) | Water vapor transmission (g./m.$^2$ hr.) |
|---|---|---|---|---|
| DL 1634-39-6 | 25 | 0.668 | 14 | 38.5 |
| -52-B | 20 | 0.480 | 27 | 64.0 |

EXAMPLE 3

A series of microporous polyurethane coated fabrics were prepared using the following procedure:

100 parts by weight of polyether-based isocyanate terminated prepolymer containing about 4% isocyanate content, available under the trade name Castomer T-4082,

*Teflon is a trademark.

was mixed with 18 parts by weight of a liquid modified diamine curative available under the name Castocure A-220, 2 parts by weight of a paste concentrate of an inorganic yellow pigment in a carrier resin available under the name of Conap Colour Concentrate 1824 and 300 parts by weight of 1,4-dichlorobenzene. The mixture was stirred at 60° C. for about 10-20 minutes to produce a uniform solution. Longer times had to be avoided to prevent gelation. The solution was applied by brush to a release paper which was either a plain paper available under the trade name Transkot Vel Cis No. 60968 or an embossed paper available under the name Ar Cis Stripkote 12108. The paper was kept at room temperature and the solution solidified thereon to produce a thin coating. The application of the solution to the release paper was repeated twice or more to produce a continuous coating of uniform thickness of about 0.1 to 0.2 cm. The crystals of dichlorobenzene were extremely well dispersed in the prepolymer matrix and the crystalline pattern could hardly be seen on the surface. A strip of cotton knit fabric was then applied to the coated side of the paper and pressed by a hot roller (50° C.) into the frozen coating to form a laminate. The paper was then removed from the laminate and the fabric coated with the frozen solution was then cured in an atmosphere saturated with dichlorobenzene vapors. Next, the coated and cured fabric strip was placed in an air circulation oven at atmospheric pressure and subjected to sublimation. The time and temperature of sublimation were varied for different strips. After the sublimation, the microporous polyurethane coated fabric strips were subjected to post-curing at 60° C. and/or 120° C. for up to 3 hours. The strips were then tested for nitrogen permeability and some were also subjected to scuff resistance tests. The conditions of curing, subliming and post-curing for various strips are shown in Table III.

was attempted at a temperature of up to about 95° C. The residual liquid dichlorobenzene appeared to swell the continuous microporous polyurethane phase and thus reduce its porosity.

Samples 54–A and 66–B were additionally tested for thickness and apparent density of the microporous coating, water vapor transmission, flex life and pore size. The results were as follows.

|  | 54–A | 66–B |
|---|---|---|
| Thickness (cm.) | 0.08 | 0.07 |
| Apparent density (g./cm.³) | 0.53 | 0.48 |
| Water vapor transmission (g./m.² hr.) | 54.5 | 26.7 |
| Flex life (k-cycles) | >325 | >325 |
| Pore size: |  |  |
| Average (microns) | 12 | 10 |
| Maximum (microns) | 1.3 | 1.0 |

What is claimed is:

1. A process for producing a microporous sheet which comprises:
   (1) depositing on a support a layer of thickness of about 0.6 cm. or less of solution of a composition which comprises a curable flowable polymer containing two or more reactive groups and having a molecular weight of about 200 to about 10,000 and a curative which is a polyfunctional compound capable of reacting with the reactive groups of said polymer in a solvent, said solvent having a freezing point of about 50° to 150° C. and being capable of forming crystals on cooling to and below the freezing point;
   (2) rapidly cooling said layer to a temperature of at least 40° C. below the freezing point of said solution whereby said solvent forms crystals dispersed in a matrix of said composition;
   (3) reacting at a temperature below about 100° C.

TABLE III

| | Conditions | | | | | | | |
|---|---|---|---|---|---|---|---|---|
| | Cure | | Sublimation | | Post-cure time at— | | Nitrogen permeability (cm.⁴/ gm. sec.× $10^{-3}$) | Scuff resistance [1] (swings/gm.) |
| | Time, (hrs.) | Temp., (° C.) | Time, (hrs.) | Temp., (° C.) | 60° C., (hrs.) | 120° C., (hrs.) | | |
| Sample No.: | | | | | | | | |
| 1774-14-1 | 6.5 | 25 | 72 | 25 | | | 3 | .0039 |
| 1774-14-4 | 5 | 38 | 72 | 25 | | | 3 | .0090 |
| 1774-15-D | 5 | 50 | 17 | 25 | | | 3 | .0042 |
| 1774-16-A | 22 | 25 | 7 and 16 | {25, 60} | | | 3 | .0177 |
| 1774-18-A | 4 | 40 | 2 | 25 | 3 | | 1 | .00216 |
| 1774-19-B | 23 | 40 | 1 | 25 | | | 3 | .00064 |
| 1774-23-A | 4 | 35 | 2 | 25 | 2 | | 1 | .0014 | 2,500 |
| 1774-25-A* | 17 | 35 | 2 | 25 | 2 | | 1 | .0256 | 550 |
| 1774-27-A | 4 | 35 | 2 | 25 | 2 | | 1 | .0026 | 1,060 |
| 1774-28-B** | 16 | 35 | 2 | 25 | 2 | | 1 | .1317 | 440 |
| 1774-54-A | 20 | 25 | 24 | 25 | | | 1 | .015 | 470 |
| 1774-66-B*** | 16 | 35 | 16 | 25 | | | 1 | .0087 | 500 |

[1] Scuff resistance was tested using a British portable skid resistance tester. The coated sample was glued to the tester and rubbed across a rough cement surface. The weight lost was measured after five swings and presented as number of swings per 1 gm. of weight loss.
*500 parts of 1, 4-dichlorobenzene was used to dissolve prepolymer plus curative.
**1,000 parts of 1, 4-dichlorobenzene was used and the perpolymer T-4082 was replaced by a perpolymer of similar type but having an isocyanate content of 6.3% (Castomer T-6082).
***Applied onto a rug cotton by a paint roller.

All the samples had uniformly textured matte coatings of pastel shades with pleasing soft hand.

The permeability to nitrogen depended on the number of factors. It increased from about 0.001 to 0.13 cm.⁴/gm. sec.×$10^{-3}$ as the concentration of the prepolymer in solution decreased from about 30% to about 10% as in 28-B. It reached a maximum when the cure temperature was about 35–40° C.: at lower temperatures of say 25° C., the polymer cured for 5 hours or less tended to shrink and/or flow together after the removal of solvent crystals, thus reducing the permeability as is shown in sample 14-1; at a temperature of 50° C. used in sample 15-D, the permeability was reduced probably due to the partial melting of solvent crystals during curing. Similar reduction in permeability was observed when the sublimation time was less than about 2 hours at 25° C. and atmospheric pressure or when a rapid sublimation said curative with said curable polymer while maintaining said solvent as crystals until said matrix becomes non-flowable and substantially insoluble in said solvent at a temperature above the freezing point; and
   (4) removing said solvent crystals by sublimation at about 20° to about 150° C. without substantially distorting said matrix,
thereby producing a microporous sheet having pore sizes of up to about 20 microns in diameter and a density of 0.1 to 0.8 gram per millilitre.

2. The process according to claim 1 wherein the composition prior to cooling is prereacted for a time period about 1 minute to about 30 minutes short of its gelation time.

3. The process according to claim 1 wherein the flowable polymer is selected from a polyether or polyester prepolymer having two or more isocyanate groups and the curative is a low molecular weight polyol or polyamine.

4. The process according to claim 1 wherein the flowable polymer is a polymer of an olefinically unsaturated compound having an average of at least two allylic halide groups per molecule and the curative is a polyamine.

5. The process according to claim 1 wherein the solution is deposited on a release paper.

6. The process according to claim 5 wherein the frozen layer deposited on the release paper is bonded to a fabric by pressing said fabric onto a heat softened surface of said layer prior to the composition becoming nonflowable and substantially insoluble.

7. The process according to claim 1 wherein the microporous sheet produced in Step (4) is heated to a temperature of between about 60° and 200° C.

8. The process according to claim 1 wherein the temperature in Step (3) is below about 60° C.

9. The process according to claim 1 wherein the reaction of Step (3) is in an atmosphere saturated with said solvent vapor.

10. The process according to claim 1 wherein the pore size of said microporous sheet is less than 10 microns in diameter.

References Cited
UNITED STATES PATENTS

| | | | |
|---|---|---|---|
| 3,589,929 | 6/1971 | Smolders et al. | 264—49 |
| 3,565,982 | 2/1971 | Day | 260—2.5 |
| 3,506,742 | 4/1970 | Buckler et al. | 260—94.7 |
| 3,376,158 | 2/1968 | Buser | 117—135.5 |
| 3,428,584 | 2/1969 | Riley | 264—49 |
| 3,484,273 | 12/1969 | Kawaso et al. | 260—2.5 |
| 3,640,753 | 2/1972 | Krauch et al. | 117—135.5 |

MELVYN I. MARQUIS, Primary Examiner

E. C. RZUCIDLO, Assistant Examiner

U.S. Cl. X.R.

117—63, 135.5; 260—2.5 AY, 2.5 H